Patented Apr. 15, 1952

2,592,860

UNITED STATES PATENT OFFICE 2,592,860

PROCESS FOR PREPARING SULFATHIAZOLE

Thomas F. Cleary, Jr., New Brunswick, N. J., assignor to E. R. Squibb & Sons, New York, N. Y., a corporation of New York No Drawing. Original application June 29, 1946, Serial No. 680,513. Divided and this application August 12, 1950, Serial No. 179,371

4 Claims. (Cl. 260—239.95)

This application is a division of application Serial No. 680,513, filed June 29, 1946.

This invention relates to the production of sulfathiazole.

Prior to this invention, sulfathiazole was generally prepared by condensing one mol of p-acetamino-benzenesulfonyl chloride with one mol of 2-amino-thiazole in the presence of pyridine, and deacetylating the resulting $N^4$-acetyl-sulfathiazole, a high degree of dryness being essential for the condensation.

Also, prior to this invention, sulfathiazole had been prepared by condensing two mols of p-acetamino-benzenesulfonyl chloride with one mol of 2-amino-thiazole to produce a "bis" compound— i. e., the di-(p-acetamino-benzenesulfonyl) derivative of 2-amino-thiazole, or bis-N-(p-acetamino-benzenesulfonyl) - 2-amino-thiazole—and hydrolyzing it to sulfathiazole (cf. application Serial No. 334,990, filed May 13, 1940, which was vested in the Alien Property Custodian and published April 20, 1943). Although such process employs an additional mol of p-acetamino-benzenesulfonyl chloride, that disadvantage is partially offset when the reactants are employed in the "wet" state (dryness not being essential for the condensation). Such "wet" process, however, gives relatively low yields of the "bis" compound (and consequently low overall yields of sulfathiazole).

It is the object of this invention to provide: [A] an advantageous method of preparing sulfathiazole; [B] an improved method of preparing di-(p-R-benzenesulfonyl) derivatives of 2-amino-thiazole, R representing a substituent capable of conversion into an amino group—especially the di-(p-acetamino-benzenesulfonyl) derivative of 2-amino-thiazole; and [C] an advantageous method of converting di-(p-R-benzenesulfonyl) derivatives of 2-amino-thiazole—especially the di-(p-acetamino-benzenesulfonyl) derivative of 2-amino-thiazole—into sulfathiazole.

In the practice of this invention, a di-(p-R-benzenesulfonyl) derivative of 2-amino-thiazole is prepared by reacting the p-R-benzenesulfonyl halide with 2-amino-thiazole in the presence of an acid-binding agent, in a two-phase medium of water and an inert organic solvent for the reactants, inter alia, ether, ethylene dichloride, pyridine, acetone, and mixtures thereof. Preferably, the inert organic solvent is acetone; the two-phase acetone-water medium being formed by substantially saturating the water with salt (sodium chloride).

The utilizable acid-binding agents (or acid-acceptors) comprise, inter alia, sodium bicarbonate (which is preferred), ammonium hydroxide, sodium carbonate, pyridine, dimethyl-aniline, and (under proper conditions) sodium hydroxide and magnesium hydroxide.

Other salting-out salts may be used in place of sodium chloride to produce a two-phase medium, inter alia, ammonium sulfate, sodium sulfate, and other alkali (including alkaline-earth-metal and ammonium) halides.

Desirably, the amount of sulfonhalide (i. e. p-R-benzenesulfonyl halide) used is in slight excess over the ratio of 2 mols of the sulfonhalide to 1 mol of 2-amino-thiazole; the amount of water used is the minimum required to obtain workable fluidity in the reaction mixture; the amount of salting-out salt used is substantially that required to saturate the amount of water used; and the amount of acid-binding agent used is that theoretically required, i. e., 1 mol per mol of the sulfonhalide.

The di-(p-R-benzenesulfonyl) derivative of 2-amino-thiazole obtained may then be subjected to (alkaline or acid) hydrolysis to split off one of the p-R-benzenesulfonyl groups and obtain the desired 2-(p - R - benzenesulfonamido)-thiazole. Where R is an acylamino group, mild alkaline hydrolysis is advantageous (over the more direct acid hydrolysis), because it permits easy recovery of part of the additional sulfonhalide used, in the form of an acyl-sulfanilic acid.

Preferably, the di-(p-R-benzenesulfonyl) derivative of 2-amino-thiazole obtained (as well as of such compounds obtained by other methods) is reacted with a member of the group consisting of ammonia and basic organic amines which can be condensed with p-R-benzenesulfonyl halides to provide chemotherapeutic agents, another (or more of the same) p-R-benzenesulfonamide being thereby formed concurrently with the 2-(p-R-benzenesulfonamido)-thiazole; and where different, these sulfonamides may be separately recovered.

Among the basic organic amines utilizable in the practice of this invention are guanidine and homosulfanilamide. Desirably, the di-(p-R-benzenesulfonyl) derivative of 2-amino-thiazole is hydrolyzed with an aqueous solution of a member of the group consisting of ammonia and guanidine, to obtain p-R-benzenesulfonamide and N-(p-R-benzenesulfonyl)-guanidine, respectively, concurrently with the readily separable 2-(p-R-benzenesulfonamido)-thiazole.

Among the substituents capable of conversion into an amino group (represented by R) are acylamino, nitro, azo, and halo; such substituent (in the final reaction product) being converted into an amino group in the conventional manner. Thus, where R in the reactant p-R-benzenesulfonyl halide is an acylamino group, the acyl reaction product obtained is deacylated (or hydrolyzed) in the conventional manner (e. g., by heating with sodium hydroxide solution); and when R in the reactant is nitro (i. e., the reactant is a p-nitro-benzenesulfonyl halide), the nitro reaction product obtained is converted into the corresponding amino compound in the usual manner (e. g., by reduction with iron and hydrochloric acid, or by hydrogenation in the presence of a palladium catalyst).

The process of this invention is especially applicable to the production of sulfathiazole along with sulfanilamide or sulfaguanidine from a di-(p-acylamino-benzenesulfonyl) derivative of 2-amino-thiazole. In such process, the sulfonamides formed may be separately recovered by cooling the reaction mixture, separating the precipitated $N^4$-acyl-sulfanilamide or $N^4$-acyl-sulfaguanidine, acidifying the filtrate, and recovering the precipitated $N^4$-acyl-sulfathiazole.

In the preparation of "bis" compounds in accordance with this invention, the reactants may be mixed in any order. Thus, all the reactants except the acid-binding agent may be mixed together first, and the acid-binding agent then added; or, preferably, all the reactants except the sulfonchloride are mixed together, and the sulfonchloride is then added as a wet cake or slurry.

The ammonia employed for the hydrolysis of the "bis" compound is conveniently added as ammonia water. Alternatively, the ammonia may be added during the reaction (e. g., by passing ammonia into a heated and agitated aqueous suspension of the "bis" compound; or the ammonia may be formed in situ (e. g., by the use of aqueous solutions of ammonia-yielding compounds, inter alia, ammonium carbonate, ammonium bicarbonate, and ammonium carbamate).

The following examples are illustrative of the invention:

EXAMPLE 1

(a) A solution of 50 g. 2-amino-thiazole in 200 ml. (160 g.) acetone is added to a solution of 120 g. sodium chloride and 90 g. sodium bicarbonate in 400 ml. water; the temperature of the mixture is adjusted to 25-30° C.; and 240 g. p-acetamino-benzenesulfonyl chloride is added to the mixture with good agitation as rapidly as foaming will permit, and stirring is continued until the evolution of $CO_2$ has ceased and a smooth slurry (of the "bis" compound) is obtained.

(b) To this slurry is added 110 g. ammonia water (26-28%), and the mixture is agitated and maintained at 65° C. for 2.5 hours. The reaction mixture (a thin, amber-colored slurry of sandy crystals) is cooled to 20° C., and filtered. The separated crystals (of $N^4$-acetyl-sulfanilamide) are washed with two 50 cc. portions of cold water, and the washes are added to the mother liquor (filtrate). [The $N^4$-acetyl-sulfanilamide obtained, when dry, melts at 214-216° C., and weighs 102 g., representing 92% of the theoretical yield based on one-half of the sulfonchloride used.] The mother liquor (containing the $N^4$-acetyl-sulfathiazole) is treated with 10 g. Darco (an activated charcoal) for one hour, and then filtered; and the pH of the filtrate is adjusted to 5.5 by addition of 38% hydrochloric acid (about 90 g. being required). The resulting precipitate (of $N^4$-acetyl-sulfathiazole) is filtered off, and washed with two 100 ml. portions of water. The dry, light-yellow product melts at 250-254° C. and weighs 130-135 g., representing 88-91% of the theoretical yield based on the 2-amino-thiazole used.

(c) 130 g. of the $N^4$-acetyl-sulfathiazole obtained is dissolved in a solution of 40 g. sodium hydroxide flakes in 200 ml. water, and the resulting clear, light-red solution is maintained at 65° C. for about 2 hours. [It is necessary to determine with certainty that the deacetylation is complete, in order to avoid contamination of the sodium-sulfathiazole with $N^4$-acetyl-sulfathiazole; and the solution should therefore be maintained at 65° C. until no acid-insoluble matter remains, as determined by the addition of a small sample of the reaction mixture to an excess of strong hydrochloric acid.] When the deacetylation is complete, a solution of 50 g. sodium hydroxide flakes in 75 ml. water is added, and the mixture is allowed to cool several hours to 20° C. The sodium-sulfathiazole crystals formed are filtered off, washed free of dark mother liquor with two 50 ml. portions of 15% sodium chloride solution (the amount of sulfathiazole remaining in the mother liquor is negligible), and (if desired) converted into sulfathiazole in the usual manner (yield 89-91 g., representing 80-82% of the theoretical based on the $N^4$-acetyl-sulfathiazole used).

(d) 102 g. of the $N^4$-acetyl-sulfanilamide obtained is added to a mixture of 50 g. 34% hydrochloric acid and 300 ml. water, and the mixture is heated to boiling for 20 minutes, then treated with 2 g. Darco for 20 minutes, and filtered. The filtrate is neutralized to pH 4.5 with about 60 g. 32% sodium hydroxide solution, and cooled to 20° C.; and the resulting crude sulfanilamide crystals are filtered off, and washed with two 50 ml. portions of cold water. The product melts at 163-164° C. and weighs 77 g. (representing 95% of the theoretical yield based on the $N^4$-acetyl-sulfanilamide used). The crude sulfanilamide is further purified by dissolving it in 1 liter water by heating to 95° C., treating the solution with 1 g. Darco, filtering, cooling the filtrate to 15° C., filtering off the resulting sulfanilamide precipitate, washing it with two 50 ml. portions of cold distilled water, and drying. The sulfanilamide thus obtained melts at 164-166° C. and weighs 70 g. (representing 75.5% of the theoretical yield from one-half of the sulfonchloride used).

EXAMPLE 2

(a) *Materials*

2-amino-thiazole (dried)—35 lbs., assaying 94.4% (0.33 mol)
p-Acetamino-benzenesulfonyl chloride—165 lbs., assaying 95.5% (0.68 mol)
Acetone—105 lbs.
Sodium chloride—93 lbs.
Sodium bicarbonate—59 lbs. (0.070 mol)
Water—264 lbs.

*Procedure*

All materials except the sulfonchloride are mixed together in a 75-gallon glass-lined reactor equipped with an 80 R. P. M. anchor-type agitator, the sulfonchloride is added over a period of one hour (while agitating), the rate of addition being governed by the foaming of the batch, and the reaction mixture is agitated for two hours after evolution of carbon dioxide has ceased. The resulting smooth slurry is centrifuged, and the separated "bis" compound is dried. It is light brown in color, melts at 123-125° C., and weighs 160 lbs. representing 97.5% of the theoretical yield). [The "bis" compound may be purified by dissolving in 6 parts warm acetone, adding an equal volume of water, and chilling, being thereby obtained as fine white needles melting with decomposition at 129–130° C.]

(b) Materials

| | Pounds |
|---|---|
| "Bis" compound (dry) | 160 |
| Water | 400 |
| 38% hydrochloric acid | 100 |
| 34% sodium hydroxide solution | 175 |
| Darco | 10 |

Procedure

The "bis compound, water, and hydrochloric acid are charged into a 75-gallon glass-lined reactor, and the mixture is heated with agitation to 98° C. (careful maintenance of the temperature below the boiling point being required to prevent serious foaming). After about 50 minutes, the reaction mixture becomes clear (indicating completion of the deacetylation); the Darco is then added, and the mixture is cooled to 50° C. and filtered through a rubber-covered filter press. [If considerable sulfathiazole hydrochloride has crystallized from the solution, it is necessary to re-slurry the press cake in water to recover it, or filter at a higher temperature.] The filtrate (and washes) are adjusted to pH 6.5 by addition of the sodium hydroxide solution, and the crude sulfathiazole precipitated is separated and dried. The product weighs 65 lbs. and assays 97.0% sulfathiazole (representing 76.2% of the theoretical yield based on the 2-aminothiazole).

(b, alternative.) The unisolated "bis" compound, i. e., the slurry obtained as described in section "a," is converted into sulfathiazole (and sulfanilamide) by the procedure described in sections "b" and "c" of Example 1.

EXAMPLE 3

(a) Materials 2-amino-thiazole (wet)—32 lbs., assaying 94.4% (0.252 mol)
p-Acetamino-benzenesulfonyl chloride—126 lbs., assaying 95.5% (0.51 mol)
Acetone—80 lbs.
Sodium chloride—70 lbs.
Sodium bicarbonate—45 lbs. (0.53 mol)
Water—200 lbs.

Procedure

Same as in section "a" of Example 2, except that first the 2-amino-thiazole is dissolved in the acetone, and the solution is treated with 1 lb. Darco and filtered before charging into the reactor (this treatment removing insoluble matter and colored impurities from the 2-aminothiazole). The "bis" compound, separated by centrifuging, washed with water, and dried, is very light tan in color, melts at 130° C., and weighs 124 lbs. (representing 99.0% of the theoretical yield).

(b) Materials

| | Pounds |
|---|---|
| "Bis" compound (dry) | 124 |
| 38% hydrochloric acid | 75 |
| 34% sodium hydroxide solution | 135 |
| Darco | 5 |
| Water | 300 |

Procedure

The water and hydrochloric acid are mixed and heated to 98° C., the "bis" compound is added over a period of 30 minutes, and the temperature is then maintained at 100–103° C. for 40 minutes. The Darco is then added, and the batch is cooled to 55° C. and filtered through a rubber-covered filter press. The filtrate is cooled to 25° C., and the pH adjusted to 6.5 by addition of the sodium hydroxide solution; and the precipitated crude sulfathiazole is separated and dried. The product is light tan in color, melts at 187–190° C., and weighs 50.5 lbs.

On conversion of this crude sulfathiazole into sodium-sulfathiazole and reconversion to sulfathiazole as described in section "c" of Example 1, pure sulfathiazole is obtained in a yield of 68% of the theoretical (based on the 2-amino-thiazole).

(b, alternative.) The "bis" compound formed in section "a," before isolation, is converted into sulfathiazole (and sulfanilamide) by the procedure described in sections "b" and "c" of Example 1.

EXAMPLE 4

The "bis" compound obtained as described in section "a" of Example 1 (either unisolated, or isolated and purified as described in section "a" of Example 2) is mixed with a dilute aqueous solution of sodium carbonate (3 mols sodium carbonate per mol "bis" compound), and the mixture is heated at 40° C. for 2 hours. The mixture is then cooled to 0° C., and the precipitate (acetyl-sulfanilic acid) is separated; and the mother liquor is neutralized, and the resulting precipitate ($N^4$ - acetyl - sulfathiazole) is separated, and deacetylated in the usual manner (e. g., by heating with aqueous sodium hydroxide solution).

EXAMPLE 5

(a) 65 g. anhydrous magnesium sulfate is dissolved in 150 ml. water, and a solution of 40 g. sodium hydroxide in 100 ml. water is added thereto. The resulting heavy slurry (of magnesium hydroxide) is added to a solution of 120 g. sodium chloride in 400 ml. water; a solution of 50 g. 2-amino-thiazole in 200 ml. acetone is added; and, while agitating vigorously, 282 g. wet p-acetamino-benzenesulfonyl chloride (containing 240 g. of the dry sulfonchloride) is added rapidly. The temperature rises to 40° C., and the pH remains constant at about 8.0. Agitation is continued for 2 hours, and the insoluble reaction product ("bis" compound) is filtered off and washed with 1 liter water.

(b) The "bis" compound is mixed with 150 ml. ammonia water and 400 ml. water, and the mixture is heated at 65° C. for 2 hours; and the reaction mixture is then treated as described in section "b" of Example 1, to isolate the $N^4$-acetyl-sulfanilamide and $N^4$-acetyl-sulfathiazole formed.

EXAMPLE 6

(a) A solution of 120 g. sodium chloride in 400 ml. water is mixed with a solution of 50 g. 2-amino-thiazole in 200 ml. acetone; 282 g. wet p-acetamino-benzenesulfonyl chloride is added; and, while agitating vigorously, a solution of 40 g. sodium hydroxide in 160 ml. water is added at such rate as to maintain the pH of the reaction mixture at 8.0. The reaction is complete in 3 hours.

(b) The reaction mixture (a slurry of the "bis" compound) is mixed with 150 ml. ammonia water, and the mixture is heated at 65° C. for 2 hours; and the reaction mixture is then treated as described in section "b" of Example 1, to iso-

EXAMPLE 7

Materials

Di-(p-acetamino-benzenesulfonyl) derivative of 2-amino-thiazole (e. g., the crude "bis" compound obtained as described in section "a" of Example 2)—27.65 lbs.
Water—1.5 gals.
Acetone—10 gals.
Sodium hydroxide—5.6 lbs.
Guanidine hydrochloride—11.2 lbs.

Procedure

The sodium hydroxide is dissolved in the water, in a reaction vessel equipped with an agitator, the solution is cooled to 68–77° F., and the acetone is added. Then the guanidine hydrochloride is added in portions, while agitating the mixture and maintaining its temperature at 68–77° F. The mixture is agitated for 15 minutes longer, and cooled to 32° F.; and, while agitating, the "bis" compound is then added at such rate that the temperature is maintained at 32–40° F., and the agitation and temperature maintenance continued for 15 minutes beyond the addition. After the reaction mixture has stood at room temperature for 2 hours, 100 gals. water is added, while agitating; and after several hours, the alkali-insoluble material ($N^4$-acetyl-sulfaguanidine) is filtered off.

The filter cake is washed with water (the wash being combined with the filtrate), and dried, yielding a crude $N^4$-acetyl-sulfaguanidine melting at 255–260° C. The $N^4$-acetyl-sulfaguanidine is then de-acetylated in the conventional manner, e. g., by the procedure described for the deacetylation of $N^4$-acetyl-sulfanilamide in section "d" of Example 1.

The combined alkaline filtrate and wash of the filter cake is adjusted to pH 4 by addition of concentrated hydrochloric acid, while agitating; and after the reaction mixture has stood for 12–16 hours, the supernate is removed, and the precipitate is recovered by filtration, washed, and dried. The crude $N^4$-acetyl-sulfathiazole thus obtained melts at 255–257° C. It is deacetylated in the conventional manner, e. g., as described in section "c" of Example 1.

EXAMPLE 8

Materials

Di-(p-acetamino-benzenesulfonyl) derivative of 2-amino-thiazole (e. g., the crude "bis" compound obtained as described in section "a" of Example 2)—49.4 g.
Pyridine—100 cc.
2-amino-thiazole—10.1 g.

Procedure

The 2-amino-thiazole is dissolved in the pyridine; and, at room temperature, the "bis" compound is added to the solution in small portions, while agitating. The temperature of the reaction mixture (which has risen to 35° C.) is then raised to 70–75° C. and maintained there for 2 hours by heating the reaction mixture on a steam bath. The reaction mixture is then cooled to room temperature; and the insoluble material therein is removed by filtration, and the filter cake is washed. The first crop of $N^4$-acetyl-sulfathiazole thus obtained weighs 27 g. and melts at 256–257° C. The filtrate (mother liquor) is then concentrated under reduced pressure, yielding a second crop weighing 13.5 g. and melting at 252–255° C. The combined crude $N^4$-acetyl-sulfathiazole is dissolved in dilute sodium hydroxide solution, treated with Darco, and filtered; and the filtrate is acidified with hydrochloric acid. The resulting precipitate is filtered off, washed, and dried, yielding 38.5 g. of a purified $N^4$-acetyl-sulfathiazole melting at 258–260° C.

The $N^4$-acetyl-sulfathiazole is deacetylated in the conventional manner, e. g., as described in section "c" of Example 1. [The unreacted 2-amino-thiazole can be recovered and reused.]

The invention may be variously otherwise embodied within the scope of the appended claims.

I claim:

1. In the method of preparing sulfathiazole, the step of hydrolyzing a di-(p-R-benzenesulfonyl) derivative of 2-amino-thiazole with an aqueous solution of a member of the group consisting of ammonia and guanidine, R representing a substituent capable of conversion into an amino group and selected from the class consisting of acylamino, nitro, azo and halo.

2. In the method of preparing sulfathiazole, the step of hydrolyzing a di-(p-acylamino-benzenesulfonyl) derivative of 2-amino-thiazole with an aqueous solution of a member of the group consisting of ammonia and guanidine, cooling the reaction mixture, separating the precipitated p-acylamino-benzene-sulfonamide, acidifying the filtrate, and recovering the precipitated $N^4$-acyl-sulfathiazole.

3. In the method of preparing sulfathiazole, the step of hydrolyzing the di-(p-acetamino-benzenesulfonyl) derivative of 2-amino-thiazole by heating with aqueous ammonia, and separating the $N^4$-acetyl-sulfanilamide and $N^4$-acetyl-sulfathiazole formed.

4. In the method of preparing sulfathiazole, the step of hydrolyzing the di-(p-acetamino-benzenesulfonyl) derivative of 2-amino-thiazole by heating with aqueous guanidine, and separating the $N^4$-acetyl-sulfaguanidine and $N^4$-acetyl-sulfathiazole formed.

THOMAS F. CLEARY, Jr.

REFERENCES CITED

The following references are of record in the file of this patent:

UNITED STATES PATENTS

| Number | Name | Date |
|---|---|---|
| 2,322,974 | Salomon | June 29, 1943 |
| 2,357,249 | Anderson | Aug. 29, 1944 |
| 2,386,852 | Hartman et al. | Oct. 16, 1945 |
| 2,392,125 | Dhein | Jan. 1, 1946 |
| 2,429,184 | Hartman et al. | Oct. 14, 1947 |

FOREIGN PATENTS

| Number | Country | Date |
|---|---|---|
| 542,160 | Great Britain | Dec. 29, 1941 |
| 545,419 | Great Britain | May 26, 1942 |
| 219,143 | Switzerland | May 16, 1942 |
| 229,080 | Switzerland | Dec. 16, 1943 |

OTHER REFERENCES

Ser. No. 334,990, Foldi et al. (A. P. C.), published April 20, 1943.

Raiziss et al.: J. Amer. Chem. Soc., vol. 63 (1941), pp. 3124–3136.